(12) United States Patent
Yasuda et al.

(10) Patent No.: US 7,507,465 B2
(45) Date of Patent: Mar. 24, 2009

(54) TRANSPARENT CONDUCTOR

(75) Inventors: Noriyuki Yasuda, Tokyo (JP); Koichi Hikida, Tokyo (JP); Chieko Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 180 days.

(21) Appl. No.: 11/392,545

(22) Filed: Mar. 30, 2006

(65) Prior Publication Data

US 2006/0222859 A1   Oct. 5, 2006

(30) Foreign Application Priority Data

Mar. 31, 2005   (JP)   ............................. P2005-105352

(51) Int. Cl.
- *B32B 27/32* (2006.01)
- *B32B 5/16* (2006.01)
- *B32B 27/00* (2006.01)
- *H01B 3/44* (2006.01)

(52) U.S. Cl. ...................... 428/220; 428/323; 428/332; 428/421; 174/110 FC (58) Field of Classification Search ....................... None
See application file for complete search history.

(56) References Cited

U.S. PATENT DOCUMENTS

| 5,246,782 | A * | 9/1993 | Kennedy et al. ............ 428/421 |
| 2002/0001710 | A1 | 1/2002 | Kang et al. |
| 2003/0144381 | A1 | 7/2003 | Mizuta et al. |

FOREIGN PATENT DOCUMENTS

| CN | 1340202 | 3/2002 |
| JP | A 08-078164 | 3/1996 |
| JP | A 11-273874 | 10/1999 |
| JP | A-2001-176335 | 6/2001 |
| JP | A-2002-167576 | 6/2002 |
| KR | 10-2004-0029932 | 4/2004 |

* cited by examiner

*Primary Examiner*—Sheeba Ahmed
(74) *Attorney, Agent, or Firm*—Oliff & Berridge, PLC

(57) ABSTRACT

The present invention provides a transparent conductor comprising a substrate, and a conductive layer containing conductive particles and a cured material of a binder, wherein the binder has at least one substituent selected from the group comprising substituents represented by undermentioned general formula (1) to (4) on side chains thereof $$F-(CF_2)n- \quad (1)$$

$$F-(CF_2CF_2O)m- \quad (2)$$

$$F-(CF_2CF_2CF_2O)p- \quad (3)$$

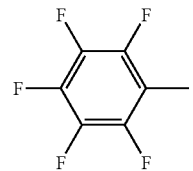

(4)

In formula (1) to (3), n, m and p each represents a positive integer.

13 Claims, 3 Drawing Sheets

TRANSPARENT CONDUCTOR

BACKGROUND OF THE INVENTION

1. Field of the Invention

The present invention relates to a transparent conductor.

2. Related Background Art

A panel switch such as a touch panel is generally constituted from a pair of transparent electrodes facing one another, and spacers sandwiched between the pair of transparent electrodes or else dot spacers printed on a conductive surface of one of the pair of transparent electrodes. With such a panel switch, upon one of the transparent electrodes being pressed, this transparent electrode contacts the other transparent electrode so that a current flows, whereby the position of the point of contact is detected. Transparent conductors are used as such transparent electrodes, and as such transparent conductors there are ones in which a sputtered film is deposited as a conductive layer on a substrate, and ones in which a conductive layer comprising conductive particles and a binder is formed on a substrate.

However, if such a transparent conductor is used in a touch panel or the like under a high-humidity environment or in an atmosphere of a chemical substance, then the transparent conductor will gradually absorb moisture or the chemical substance, and hence the electrical resistance of the transparent conductor will increase, and furthermore the change over time in this electrical resistance will tend to become greater. If such a transparent conductor is used, for example, in a touch panel or the like and placed under an environment as above, then there will thus be a risk of the operation of the touch panel gradually becoming unstable.

A transparent conductor according to which increase in or change over time in the electrical resistance caused by absorption of moisture or a chemical substance is suppressed is thus desired. For example, there has been proposed a light-transmitting conductive material using a phenoxy resin or a mixed resin of a phenoxy resin and an epoxy resin made to have low hygroscopicity, or polyvinylidene fluoride, as a resin for fixing conductive particles in place (see, for example, Japanese Patent Application Laid-open No. 08-78164, Japanese Patent Application Laid-open No. 11-273874).

SUMMARY OF THE INVENTION

However, in the case of using a light-transmitting conductive material as described in Japanese Patent Application Laid-open No. 08-78164 or Japanese Patent Application Laid-open No. 11-273874 as a transparent conductor in a touch panel or the like, if this transparent conductor is placed under a high-humidity environment or an atmosphere of a chemical substance, then it tends to be difficult to adequately suppress increase in or change over time in the electrical resistance of the transparent conductor.

In view of the above state of affairs, it is an object of the present invention to provide a transparent conductor according to which increase in or change over time in the electrical resistance thereof can be adequately suppressed even under a high-humidity environment or an atmosphere of a chemical substance.

The present inventors carried out assiduous studies to attain the above object, and as a result discovered that if fluorocarbon groups are provided on side chains of the above-mentioned binder, then increase in or change over time in the electrical resistance can be adequately suppressed. The present inventors then carried out further assiduous studies, and as a result discovered that the above object can be attained through inventions as follows, thus accomplishing the present invention.

That is, the present invention provides a transparent conductor comprising a substrate, and a conductive layer containing conductive particles and a cured material of a binder, wherein the binder has at least one substituent selected from the group comprising substituents represented by undermentioned general formula (1) to (4) on side chains thereof.

F—(CF$_2$)n—  (1)

F—(CF$_2$CF$_2$O)m—  (2)

F—(CF$_2$CF$_2$F$_2$O)p—  (3)

(4)

In formula (1) to (3), n, m and p each represents a positive integer.

Here, the transparent conductor of the present invention may be film-like or plate-like, film-like meaning that the transparent conductor has a thickness in a range of 50 nm to 1 mm, and plate-like meaning that the transparent conductor has a thickness exceeding 1 mm.

For the transparent conductor of the present invention, through the conductive layer being made to contain a cured material of a binder having a substituent as above on side chains thereof (hereinafter sometimes referred to merely as the "cured material"), increase in or change over time in the electrical resistance of the transparent conductor can be adequately suppressed even under a high-humidity environment or an atmosphere of a chemical substance.

Moreover, for the transparent conductor of the present invention, through the conductive layer of the transparent conductor being made to contain a cured material of a binder having fluorocarbon groups therein, the transparent conductor can be made to have excellent wear resistance. Accordingly, because the transparent conductor of the present invention has excellent wear resistance, a situation in which worn off transparent conductor becomes reattached can be prevented, and hence local increase in the electrical resistance can also be adequately suppressed. Furthermore, the conductive layer not only prevents the transparent conductor from being worn away by friction between transparent conductors, but moreover also exhibits a water/oil-repelling action of making attachment of dirt and so on not prone to occur, and hence deterioration of the transparent conductor is also adequately suppressed. Furthermore, for the transparent conductor, cracking of the conductive layer can also be suppressed, and hence the lifetime of the transparent conductor can be extended.

The mechanism by which increase in or change over time in the electrical resistance of the transparent conductor can be adequately suppressed and moreover local increase in the electrical resistance can be adequately suppressed in this way is still not clear, but is thought by the present inventors to be because due to the cured material contained in the conductive layer having fluorocarbon groups on side chains thereof, the side chains of the cured material form a dense structure because the fluorocarbon groups have crystallinity, and moreover the fluorocarbon groups have very low intermolecular forces, and also low surface energy, and hence for the transparent conductor of the present invention, infiltration of moisture and chemical substances from the outside into the conductive layer can be prevented. Moreover, it is thought by the present inventors that due to the cured material having fluorocarbon groups on side chains thereof, fluorocarbon groups having excellent wear resistance are present on the surface of the conductive layer, and hence for the transparent conductor of the present invention, even if friction arises between transparent conductors, the surface of each transparent conductor can be prevented from being worn away.

For the above transparent conductor, preferably, the binder is one polymerized from at least one monomer, the monomer having therein a substituent represented by one of undermentioned general formula (1) to (4).

(1)

(2)

(3)

(4)

In formula (1) to (3), n, m and p each represents a positive integer.

If the monomer has a substituent represented by one of general formula (1) to (4) therein, then a binder having a substituent represented by one of general formula (1) to (4) therein can be easily obtained by polymerization. Moreover, so long as the above monomer has a substituent represented by one of general formula (1) to (4) therein, the binder can be obtained by polymerizing a plurality of monomers. In this case, desired transparent conductors having, for example, different glass transition points can be obtained.

For the above transparent conductor, preferably, the monomer has therein a polymerizable functional group represented by one of undermentioned general formula (5) to (8).

(5)

(6)

(7)

(8)

In formula (5), $R^1$ represents a bivalent hydrocarbon group, and $R^2$ represents a hydrogen atom or a methyl group. In formula (7), $R^3$ represents a hydrogen atom, a methyl group, an ethyl group, or a propyl group.

If the above monomer has therein a polymerizable functional group represented by one of general formula (5) to (8), then the cured material obtained by curing the binder will have fluorocarbon groups on side chains of a straight chain of C—C linkages, and hence a cured material that is less prone to infiltration by moisture and so on can be obtained. The conductive layer containing this cured material can thus be made less prone to swelling.

For the above transparent conductor, preferably, the polymerizble functional group is a polymerizable functional group represented by undermentioned general formula (5).

(5)

In formula (5), $R^1$ represents a bivalent hydrocarbon group, and $R^2$ represents a hydrogen atom or a methyl group.

For the cured material of a binder synthesized from such a monomer, the refractive index can be reduced. That is, for a transparent conductor containing a conductive layer containing this cured material, the transparency can be improved. Moreover, the cured material will also be excellent in terms of chemical resistance to acids and alkalis, and also scratch resistance (surface hardness). The transparent conductor will thus be yet more suitable for use in a touch panel or the like that it is envisaged will be wiped with cleaning agents containing organic solvents, surfactants and so on, or will be subjected to contact or rubbing between mutually facing conductive surfaces.

For the above transparent conductor, preferably, the binder contains a copolymer of the above monomer, and one other monomer or binder having a vinyl group therein.

A conductive layer containing the cured material of this copolymer has improved mechanical strength. Consequently, for a transparent conductor containing this conductive layer, increase in or change over time in the electrical resistance of the transparent conductor can be adequately suppressed even under a high-humidity environment or an atmosphere of a chemical substance, and even if friction arises between transparent conductors, the surface of each transparent conductor can be prevented from being worn away, and hence local increase in the electrical resistance can be adequately suppressed, and moreover the mechanical strength of the transparent conductor can be improved. Furthermore, as a result, the transparent conductor will have excellent durability upon repeated use.

For the above transparent conductor, preferably, the binder has a fluorine content in a range of 1.85 to 68.3 mass %.

In this case, the transparent conductor will have yet better wear resistance, and hence increase in or change over time in the electrical resistance of the transparent conductor can be suppressed yet more thoroughly even under a high-humidity environment or an atmosphere of a chemical substance.

According to the transparent conductor of the present invention, the transparent conductor has excellent wear resistance, and increase in or change over time in the electrical resistance can be adequately suppressed even under a high-humidity environment or an atmosphere of a chemical substance.

BRIEF DESCRIPTION OF THE DRAWINGS

FIG. 2 is a schematic sectional view showing a transparent conductor 2a; and

DESCRIPTION OF THE PREFERRED EMBODIMENTS

Following is a detailed description of preferred embodiments of the present invention, with reference to the drawings as required. Note that in the drawings, elements that are the same as one another are designated by the same reference numeral, and redundant repeated description will be omitted. Moreover, dimensional ratios are not limited to being the ratios shown in the drawings.

First Embodiment

Figure 1:
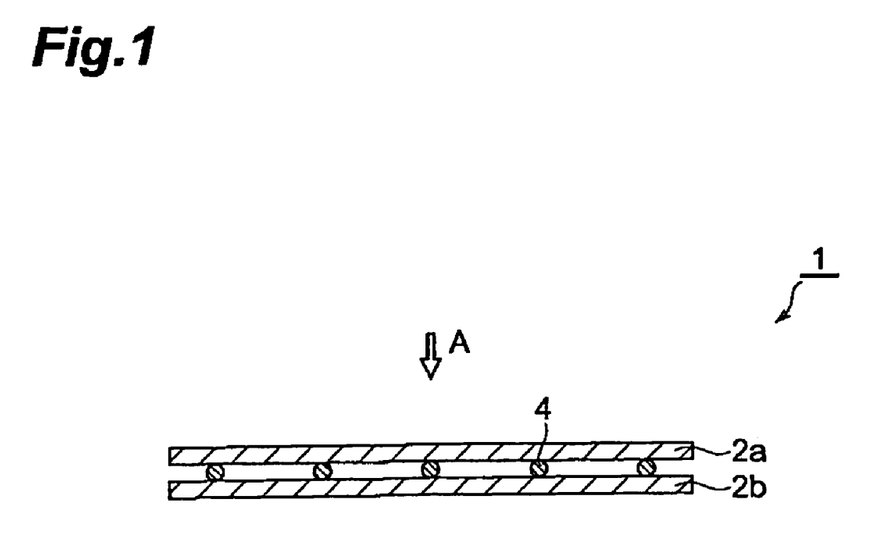
FIG. 1 is a schematic sectional view showing one embodiment of a touch panel of the present invention.

FIG. 1 is a schematic sectional view showing a touch panel to which one embodiment of a transparent conductor of the present invention is applied. As shown in FIG. 1, the touch panel 1 of the present embodiment comprises a pair of transparent conductors 2a and 2b facing one another, and spacers 4 provided between the pair of transparent conductors.

In the touch panel 1, the transparent conductor 2a is pressed from the outside A of the transparent conductor 2a, so that the transparent conductor 2a contacts the other transparent conductor 2b and thus a current flows, whereby the position of the point of contact is detected.

Figure 2:
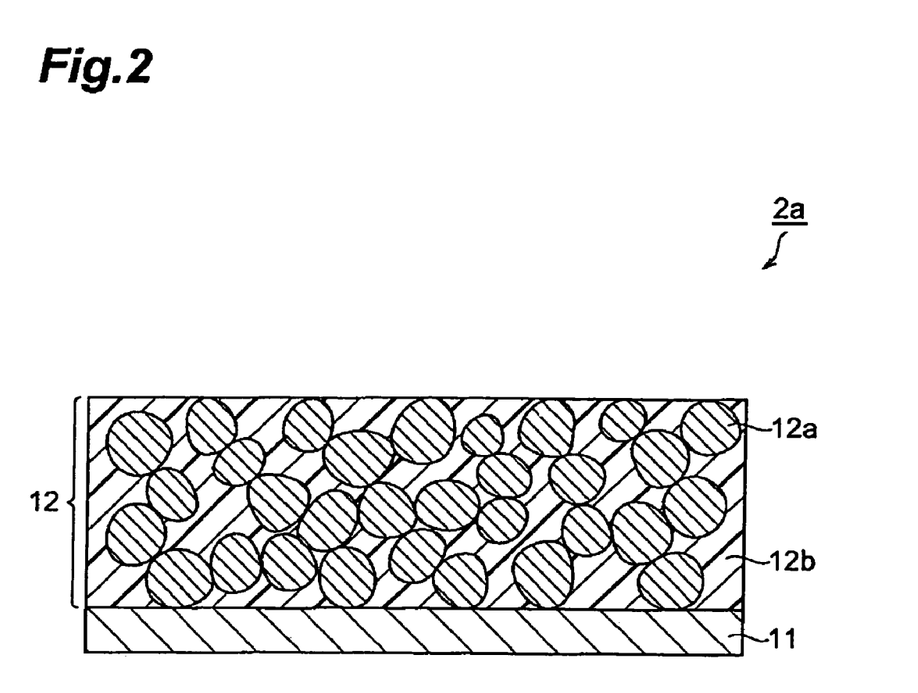

<Transparent conductor> Here, a description will be given of the transparent conductor 2a.

FIG. 2 is a schematic sectional view showing the transparent conductor 2a. As shown in FIG. 2, the transparent conductor 2a comprises a substrate 11, and a conductive layer 12 containing conductive particles 12a and a cured material 12b of a binder. The transparent conductor 2a, is disposed such that the conductive layer 12 is on the inside. The binder has at least one substituent selected from the group comprising substituents represented by previously mentioned general formula (1) to (4) on side chains thereof.

Through making the transparent conductor 2a according to the present embodiment have the above constitution, the transparent conductor 2a has excellent wear resistance, increase in or change over time in the electrical resistance of the transparent conductor 2a can be adequately suppressed even in the case that the transparent conductor 2a is used under a high-humidity environment or an atmosphere of a chemical substance, and moreover even if friction arises between the transparent conductors 2a and 2b in the touch panel 1, the surface of the transparent conductor 2a can be prevented from being worn away, and hence local increase in the electrical resistance can be adequately suppressed.

Moreover, with the touch panel 1 according to the present embodiment, due to the excellent wear resistance, even in the case that the transparent conductor 2a is worn away, a situation in which worn off transparent conductor becomes reattached can be prevented, and hence local increase in the electrical resistance can also be adequately suppressed. Furthermore, the conductive layer 12 not only prevents the transparent conductor 2a from being worn away by friction between the transparent conductor 2a and the transparent conductor 2b, but moreover also exhibits a water/oil-repelling action of making attachment of dirt and so on not prone to occur, and hence deterioration of the transparent conductor 2a is also adequately suppressed. Furthermore, cracking of the transparent conductor 2a can also be suppressed, and hence the lifetime of the transparent conductor 2a, and thus the lifetime of the touch panel 1, can be extended.

Moreover, in the touch panel 1, the transparent conductor 2b preferably has the same constitution as the transparent conductor 2a. Here, the transparent conductor 2b is disposed such that the conductive layer thereof is on the inside. In this case, the effects described above for the touch panel 1 can be achieved yet better.

Next, the conductive layer 12 and the substrate 11 will be described in more detail.

<Conductive layer> The transparent conductor according to the present embodiment has a conductive layer 12, the conductive layer 12 containing conductive particles 12a and a cured material 12b of a binder that has at least one substituent selected from the group comprising substituents represented by general formula (1) to (4) on side chains thereof.

The cured material is obtained by curing the binder. There are no particular limitations on the curing method, with examples including heat curing, photo-curing, and curing through chemical reaction. Curing through chemical reaction includes curing in which one compound is reacted with another compound, and curing through contact with air or water. Moreover, the binder may be thermoplastic. In this case, the binder can be used in a molten state, and then cured by cooling.

There are no particular limitations on the structure of the main chain of the binder. In the present invention, regardless of the structure of the main chain of the binder, through the binder having at least one substituent selected from the group comprising substituents represented by general formula (1) to (4) on side chains thereof, increase in or change over time in the electrical resistance of the transparent conductor can be adequately suppressed even under a high-humidity environment or an atmosphere of a chemical substance, and moreover even if friction arises between transparent conductors, the surface of each transparent conductor can be prevented from being worn away, and hence an effect is achieved whereby local increase in the electrical resistance can be adequately suppressed The binder must have a substituent as above on side chains thereof. Accordingly, in the binder, the substituent may be directly bonded to the main chain of the binder so as to actually form side chains of the binder, or the substituent may be bonded to side chains of the binder.

n, m and p for the substituents represented by general formula (1) to (3) respectively must each represent a positive integer, but preferably n is in a range of 1 to 10, m is in a range of 1 to 5, and p is in a range of 1 to 5. If n exceeds 10, then compared with the case that n is in the above range, phase separation will tend to be prone to occur upon mixing with another monomer. If m or p exceeds 5, then compared with the case that m or p is in the above range, phase separation will tend to be prone to occur upon mixing with another monomer.

Moreover, because the binder has therein at least one substituent selected from the group comprising substituents represented by general formula (1) to (4) on side chains thereof, this means that the binder has fluorocarbon groups on the side chains thereof. The fluorine content in the binder here is preferably in a range of 1.85 to 68.3 mass %. If the fluorine content is less than 1.85 mass %, then compared with the case that the fluorine content is in the above range, the effects of introducing the functional groups will tend to not be adequately obtained, whereas if the fluorine content exceeds 68.3 mass %, then compared with the case that the fluorine content is in the above range, the mechanical strength of the cured material will tend to drop.

In the present embodiment, the binder may be manufactured by forming the main chain of the binder, and then reacting the binder with a compound having a substituent represented by one of general formula (1) to (4) therein, or may be manufactured by introducing the substituent before forming the main chain of the binder, i.e. by polymerizing a monomer, dimer, trimer, tetramer, oligomer or the like having a substituent represented by one of general formula (1) to (4) therein.

Of the above, from the viewpoint of reactivity, the binder is preferably manufactured by polymerizing a monomer having a substituent represented by one of general formula (1) to (4) therein. If the binder in the present embodiment is manufactured by forming the main chain of the binder and then reacting the binder with the substituent, then the reaction between the binder and the substituent will tend to take place with difficulty due to steric hindrance of the binder.

For the transparent conductor, the binder is preferably one polymerized from at least one monomer, the monomer having therein a substituent represented by one of general formula (1) to (4).

If the monomer has a substituent represented by one of general formula (1) to (4) therein, then a binder having the substituent represented by one of general formula (1) to (4) therein can be easily obtained by polymerization. Moreover, so long as the above monomer has a substituent represented by one of general formula (1) to (4) therein, the binder can be obtained by polymerizing a plurality of monomers. In this case, desired transparent conductors having, for example, different glass transition points can be obtained.

Here, a preferable glass transition point for the binder is not more than 50° C. If the glass transition point exceeds 50° C., then compared with the case that the glass transition point is not more than 50° C., the durability will tend to be poor in the case that the transparent conductor using the binder is used in a touch panel or the like.

For the transparent conductor, the monomer preferably has therein a polymerizable functional group represented by one of previously mentioned general formula (5) to (8).

Here, there are no particular limitations on $R^1$ in general formula (5) so long as $R^1$ is a bivalent hydrocarbon group, but $R^1$ is preferably a methylene group, an ethylene group, a propylene group, or an isopropylene group. If $R^1$ is one of these substituents, then there is the advantage that the range of rotation during free movement of the fluorocarbon group can be appropriately controlled.

If the above monomer has therein a polymerizable functional group represented by one of general formula (5) to (8), then the cured material obtained by curing the binder will have fluorocarbon groups on side chains of a straight chain of C—C linkages, and hence a cured material that is less prone to infiltration by moisture and so on can be obtained. The conductive layer containing this cured material can thus be made less prone to swelling.

The above monomer preferably has therein both a substituent represented by one of general formula (1) to (4), and a polymerizable functional group represented by one of general formula (5) to (8). Note that so long as the monomer has therein both a substituent represented by one of general formula (1) to (4) and a polymerizable functional group represented by one of general formula (5) to (8), there are no particular limitations on the rest of the structure of the monomer.

If the monomer has therein both a substituent represented by one of general formula (1) to (4) and a polymerizable functional group represented by one of general formula (5) to (8) in this way, then a cured material that is less prone to infiltration by moisture and chemical substances can be obtained. The conductive layer containing this cured material can thus be made less prone to swelling.

The above monomer is particularly preferably a compound represented by one of undermentioned general formula (9) to (24).

(9)

(10)

(11)

(12)

(13)

(14)

(15)

(16)

(17)

(18)

(19)

-continued $H_2C=\underset{H}{C}—(CF_2)n—F$ (21)

$H_2C=\underset{H}{C}—(CF_2CF_2O)m—F$ (22)

$H_2C—\underset{H}{\overset{H}{C}}—(CF_2CF_2CF_2O)p—F$ (23)

(24) [structure: $H_2C=\underset{H}{C}$—pentafluorophenyl with F]

In formula (9) to (24), n, m and p each represents a positive integer. In formula (9) to (12), $R^1$ represents a bivalent hydrocarbon group, and $R^2$ represents a hydrogen atom or a methyl group. Moreover, in formula (17) to (20), $R^3$ represents a hydrogen atom, a methyl group, an ethyl group, or a propyl group.

Note that n, m and p in formula (9) to (24) correspond to n, m and p in previously mentioned general formula (1) to (3), and $R^1$ in formula (9) to (12) corresponds to $R^1$ in previously mentioned general formula (5).

The polymerizable functional group in the monomer is a polymerizable functional group represented by one of general formula (5) to (8), and of these, a polymerizable functional group represented by general formula (5) is preferable.

For the cured material of a binder synthesized by polymerizing a monomer having a polymerizable functional group represented by general formula (5), the refractive index can be reduced. That is, for a transparent conductor containing a conductive layer containing this cured material, the transparency can be improved. Moreover, the cured material will also be excellent in terms of chemical resistance, and also scratch resistance. The transparent conductor will thus be yet more suitable for use in a touch panel or the like that it is envisaged will be wiped with cleaning agents containing organic solvents, surfactants and so on, or will be subjected to contact or rubbing between mutually facing conductive surfaces.

From such viewpoints, as the structure of the monomer, one represented by one of general formula (9) to (12) is particularly preferable.

The binder of the present invention preferably has ether linkages in the side chains thereof. In this case, compared with the case that the substituent does not have an ether linkage therein, the conductive layer 12 having the binder therein can be made more flexible since movement such as rotation, vibration, and elongation/contraction can take place freely at the ether linkages. Consequently, not only can the wear resistance of the conductive layer 12 be improved, but moreover cracking can be yet better suppressed. From such a viewpoint, out of the substituents represented by general formula (1) to (4), the side chains of the binder particularly preferably have a substituent represented by general formula (2) or (3) therein.

The binder preferably contains a copolymer of a monomer having therein a polymerizable functional group represented by one of general formula (5) to (8) hereinafter sometimes referred to as the "first monomer") and one other monomer having a vinyl group therein (hereinafter sometimes referred to as the "second monomer"). By copolymerizing such a first monomer and such a second monomer in this way, desired functionality can be added to the binder. For example, if a monomer having a plurality of polymerizable functional groups in the molecule thereof or the like is used as the second monomer, then the mechanical strength of a conductive layer containing the cured material of the copolymer obtained can be improved.

Of the above, as the other monomer capable to improving the mechanical strength of the conductive layer containing the copolymer, it is preferable to use a diacrylate, a triacrylate, a tetraacrylate, a hexaacrylate, or the like. In this case, the mechanical strength of the transparent conductor is improved, and hence upon using the transparent conductor in a touch panel or the like, the durability will be excellent even upon using the touch panel repeatedly.

Moreover, in the case of copolymerizing such a first monomer and such a second monomer together, the first monomer preferably has therein a polymerizable functional group represented by general formula (5) or (8). In this case, because each of these monomers has a double bond therein, the copolymerization reaction with the second monomer can be carried out in one go.

As mentioned earlier, the conductive layer 12 contains conductive particles 12a. These conductive particles 12a are packed together such that adjacent conductive particles 12a contact one another. As a result, the conductive layer 12 functions as a conductor.

The conductive particles 12a are constituted from a transparent conductive oxide material. There are no particular limitations on the transparent conductive oxide material so long as this material is both transparent and conductive; examples of such a transparent conductive oxide material include indium oxide, or indium oxide doped with at least one element selected from the group comprising tin, zinc, tellurium, silver, gallium, zirconium, hafnium and magnesium, tin oxide, or tin oxide doped with at least one element selected from the group comprising antimony, zinc and fluorine, and zinc oxide, or zinc oxide doped with at least one element selected from the group comprising aluminum, gallium, indium, boron, fluorine and manganese.

The mean particle diameter of the conductive particles 12a is preferably in a range of 10 nm to 80 nm. If the mean particle diameter is less than 10 nm, then compared with the case that the mean particle diameter is at least 10 nm, the conductivity of the transparent conductor 2a will tend to be prone to fluctuating. That is, for the transparent conductor 2a according to the present embodiment, conductivity arises through oxygen defects that occur in the conductive particles 12a, but if the mean particle diameter of the conductive particles 12a is less than 10 nm, then compared with the case that the mean particle diameter is in the above range, in the case for example that the external oxygen concentration is high the number of oxygen defects may drop, and hence the conductivity may fluctuate. On the other hand, if the mean particle diameter exceeds 80 nm, then compared with the case that the mean particle diameter is in the above range, in for example the wavelength region of visible light, there will be more scattering of light than in the case that the mean particle diameter is not more than 80 mm, and hence the transmissivity of the transparent conductor 2a in the wavelength region of visible light will tend to drop, and the haze value will tend to increase.

Furthermore, the packing fraction of the conductive particles 12a in the conductive layer 12 is preferably in a range of 10 vol % to 70 vol %. If the packing fraction is less than 10 vol %, then compared with the case that the packing fraction is in the above range, the electrical resistance of the transparent conductor 2a will tend to increase, whereas if the packing fraction exceeds 70 vol %, then compared with the case that packing fraction is in the above range, the mechanical strength of the film forming the conductive layer 12 will tend to drop.

In this way, if the mean particle diameter and the packing fraction of the conductive particles 12a are in the above ranges, then the transparency of the transparent conductor can be improved, and moreover the initial electrical resistance can be reduced.

Moreover, the specific surface area of the conductive particles 12a is preferably in a range of 10 m$^2$/g to 50 m$^2$/g. If the specific surface area is less than 10 m$^2$/g, then compared with the case that the specific surface area is in the above range, there will tend to be more scattering of visible light, whereas if the specific surface area exceeds 50 m$^2$/g, then compared with the case that the specific surface area is in the above range, the stability of the transparent conductor 2a will tend to drop. Note that the specific surface area referred to here is the value as measured using a specific surface area measuring apparatus (model: NOVA 2000, made by Ouantachrome) after the sample has been vacuum-dried for 30 minutes at 300° C.

The thickness of the conductive layer 12 is preferably in a range of 50 nm to 5 μm. If the thickness is less than 50 nm, then compared with the case that the thickness is in the above range, the wear resistance will tend to drop, whereas if the thickness exceeds 5 μm, then compared with the case that the thickness is in the above range, glare or the like will tend to arise due to the influence of the surface roughness and the refractive index of the conductive layer 12 and so on, and hence the visibility will tend to drop.

The conductive layer 12 according to the present embodiment is preferably made to further contain a crosslinking agent. By including a crosslinking agent in the conductive layer 12, the binder can be crosslinked together, and hence the cured material of the binder can be made to have a denser structure. Accordingly, in this case, infiltration of moisture from the outside into the conductive layer can be yet better prevented, and hence increase in or change over time in the electrical resistance of the transparent conductor can be suppressed yet more thoroughly even under a high-humidity environment or an atmosphere of a chemical substance. Moreover, an effect of suppressing cracking can also be achieved.

There are no particular limitations on the crosslinking agent so long as the crosslinking agent is one having a plurality of vinyl groups in the molecule thereof. With such a crosslinking agent, the vinyl groups of the crosslinking agent bond to the binder, and hence a number of sites on molecules of the binder corresponding to the number of vinyl groups can be crosslinked together. From such a viewpoint, the greater the number of vinyl groups the better, specifically 2 to 100 is preferable. Note that if the number of vinyl groups exceeds 100, then compared with the case that the number of vinyl groups is in the above range, the crosslink density will tend to drop due to suppression of free movement.

As the crosslinking agent, one having a fluorocarbon group in the molecule thereof can also be suitably used, a compound represented by undermentioned general formula (25) being particularly preferable. In this case, the conductive layer 12 will have yet better wear resistance, and hence even if friction arises between transparent conductors, the surface of each transparent conductor can be prevented from being worn away, and hence local increase in the electrical resistance can be suppressed yet better.

$$H_2C=CH-\underset{\underset{O}{\|}}{C}-O-(CF_2)q-O-\underset{\underset{O}{\|}}{C}-CH=CH_2 \quad (25)$$

q in formula (25) represents a positive integer.

q for the crosslinking agent represented by above-mentioned general formula (25) must be a positive integer, but preferably q is in a range of 1 to 10. If q exceeds 10, then compared with the case that q is in the above range, the mechanical strength will tend to drop.

The conductive layer 12 according to the present embodiment is preferably made to further contain a surface treatment agent for surface treating the conductive particles 12a. By including such a surface treatment agent in the conductive layer 12, the conductive particles 12a and the binder can be coupled together, and hence adsorption of moisture onto the conductive particles 12a can be suppressed yet better. Accordingly, in this case, infiltration of moisture from the outside into the conductive layer can be yet better prevented, and hence increase in or change over time in the electrical resistance of the transparent conductor can be suppressed yet better even under a high-humidity environment or an atmosphere of a chemical substance.

Note that "surface treating" here refers to treatment that reduces the surface energy of the surfaces of the conductive particles so as to bestow water repellency or lipophilicity, for example treatment that reduces the number of hydroxyl groups on the surfaces of the conductive particles.

An example of such a surface treatment agent is a silane coupling agent or silazane compound having at least one vinyl group in the molecule thereof. Moreover, this surface treatment agent is preferably a silane coupling agent or silazane compound having a plurality of vinyl groups therein. Through the surface treatment agent having a plurality of vinyl groups therein, the surface treatment agent can not only couple the conductive particles 12a and the binder together, but moreover can crosslink the binder together. In other words, in this case, a macromolecular network can formed between the conductive particles 12a and a plurality of binder molecules. Accordingly, infiltration of moisture from the outside into the conductive layer can be yet better prevented, and hence increase in or change over time in the electrical resistance of the transparent conductor can be suppressed particularly well even under a high-humidity environment or an atmosphere of a chemical substance. Moreover, in this case, an effect of suppressing cracking can also be achieved.

The conductive layer 12 may further contain additives as required. Examples of additives include, in addition to crosslinking agents and surface treatment agents as described above, photopolymerization initiators, fire retardants, UV absorbers, colorants, and plasticizers.

<Substrate> There are no particular limitations on the substrate 11 so long as the substrate 11 is constituted from a material that is transparent to the high energy radiation mentioned below and visible light That is, the substrate 11 may be a publicly known transparent film, with examples including a film of a polyester such as polyethylene terephthalate (PET), a film of a polyolefin such as polyethylene or polypropylene, a polycarbonate film, an acrylic film, or a norbornene film (e.g. Arton made by JSR). Other than a resin film, glass can also be used as the substrate 11. The substrate 11 preferably comprises a resin only. In this case, the transparency and flexibility of the transparent conductor are better than in the case that the substrate 11 contains both a resin and a material other than a resin. This is particularly effective in the case of use in a touch panel or the like.

<Manufacturing method> Next, a description will be given of a method of manufacturing the transparent conductor 2a according to the present embodiment for the case that indium oxide doped with tin (hereinafter referred to as "ITO") is used for the conductive particles 12a.

First, indium chloride and tin chloride are subjected to neutralization treatment using an alkali so as to bring about coprecipitation (precipitation step). Salt by-produced at this time is removed by decantation or centrifugal separation. The coprecipitate obtained is dried, and then the dried matter obtained is subjected to baking in an atmosphere and pulverization. The conductive particles are thus manufactured. From the viewpoint of controlling oxygen defects, the above baking is preferably carried out in a nitrogen atmosphere, or an atmosphere of a noble gas such as helium, argon or xenon.

A binder having therein a substituent represented by one of general formula (1) to (4), or a monomer having therein a substituent represented by one of general formula (1) to (4) and a polymerizable functional group represented by one of general formula (5) to (8) is added to the conductive particles 12a thus obtained, and dispersion is carried out in a liquid to obtain a dispersion. Note that in the case of adding additives, these are preferably mixed into this dispersion. Examples of the liquid for dispersing the conductive particles 12a, and the binder or monomer include saturated hydrocarbons such as hexane, aromatic hydrocarbons such as toluene and xylene, alcohols such as methanol, ethanol, propanol and butanol, ketones such as acetone, methyl ethyl ketone, isobutyl methyl ketone and diisobutyl ketone, esters such as ethyl acetate and butyl acetate, ethers such as tetrahydrofuran, dioxane and diethyl ether, and amides such as N,N-dimethylacetamide, N,N-dimethylformamide and N-methylpyrrolidone. Here, the binder or monomer may be used dissolved in the liquid.

The dispersion thus obtained is coated onto the substrate 11. It is also possible to provide an anchor layer in advance on the surface of the substrate 11 to which the conductive layer 12 is to be adhered. If an anchor layer is provided on the baseplate in advance, then the conductive layer 12 can be fixed to the substrate 11 more firmly via the anchor layer. A polyurethane or the like can be suitably used as the anchor layer.

Moreover, in the case of using a liquid as above, a drying step is preferably carried out after the coating on. Examples of possible coating methods include a reverse rolling method, a direct rolling method, a blade method, a knife method, an extrusion method, a nozzle method, a curtain method, a gravure rolling method, a bar coating method, a dipping method, a kiss coating method, a spin coating method, a squeezing method, and spraying.

The uncured conductive layer formed on the substrate 11 is then cured. Here, if components contained in the uncured conductive layer are heat curable, then the conductive layer 12 is formed by heating, whereas if components contained in the uncured conductive layer are photo-curable, then the conductive layer 12 is formed by irradiating with high energy radiation. Note that in the case that the components contained in the uncured conductive layer are photo-curable, the uncured conductive layer preferably contains a photopolymerization initiator. In other words, a photopolymerization initiator is preferably included in the above dispersion. Moreover, the high energy radiation may be, for example, UV radiation, or else an electron beam, γ-rays, X-rays or the like.

Through the conductive layer 12 being formed on one surface of the substrate 11 in this way, a transparent conductor 2a as shown in FIG. 2 is obtained. The transparent conductor 2a can be suitably used in a noise-counteracting component, a heating element, an EL electrode, a backlight electrode, a touch panel, or the like.

Second Embodiment

Next, a second embodiment of the touch panel of the present invention will be described. Note that component elements the same as or similar to ones in the first embodiment are designated by the same reference numeral as in the first embodiment, and redundant repeated description will be omitted.

Figure 3:
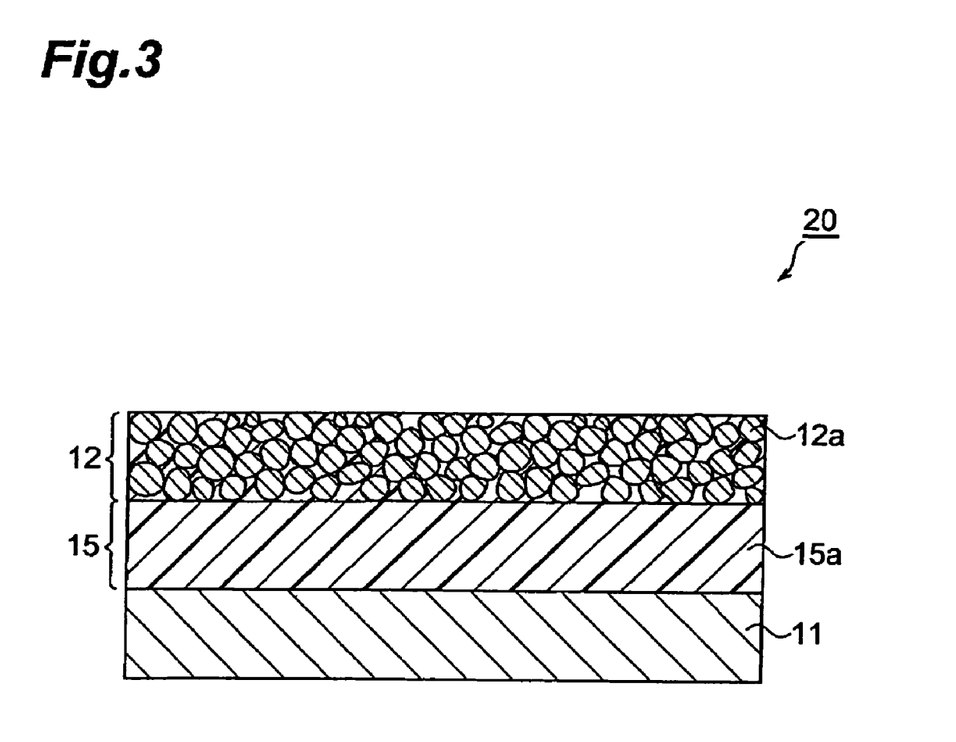
FIG. 3 is a schematic sectional view showing a transparent conductor used in a second embodiment of the touch panel of the present invention.

FIG. 3 is a schematic sectional view showing a transparent conductor used in the second embodiment of the touch panel of the present invention. As shown in FIG. 3, the transparent conductor 20 comprises a substrate 11, a cured material layer 15, and a conductive layer 12 containing conductive particles 12a, the cured material layer 15 and the conductive layer 12 being laminated on the substrate 11 in this order. The conductive particles 12a are packed together in the conductive layer 12; cured material 15a that has penetrated in is present between the conductive particles 12a, the cured material 15a fixing the conductive particles 12a in place.

As for the transparent conductor 2a according to the first embodiment, the transparent conductor 20 of the present embodiment is disposed in the touch panel 1 such that the conductive layer 12 is on the side of the surface on which friction arises.

Accordingly, when the surface of the touch panel 1 is pressed, the transparent conductors facing one another contact one another, but for the transparent conductor 20 of the present embodiment, the conductive layer 12 contains cured material of a binder having at least one substituent selected from the group comprising substituents represented by previously mentioned general formula (1) to (4) on side chains thereof, and hence even if friction arises with the transparent conductor 20, because the transparent conductor 20 has the conductive layer 12 on the side of the surface on which the friction arises, the surface of the transparent conductor 20 can be prevented from being worn away.

Moreover, due to the above, for the touch panel 1 according to the present embodiment, even in the case that the transparent conductor 20 is worn away, a situation in which worn off transparent conductor 20 becomes reattached can be prevented, and hence local fluctuation in the electrical resistance can also be adequately suppressed. Furthermore, the conductive layer 12 not only prevents the transparent conductor 20 from being worn away by friction with the transparent conductor 20, but moreover also exhibits a water/oil-repelling action of making attachment of dirt and so on not prone to occur, and hence deterioration of the transparent conductor 20 is also adequately suppressed. Furthermore, cracking of the transparent conductor 20 can also be suppressed, and hence the lifetime of the transparent conductor transparent conductor 20 can be extended.

The transparent conductor 20 can be manufactured, for example, as follows. First, the conductive particles 12a are placed on a glass baseplate, not shown. Here, it is preferable to provide an anchor layer on the baseplate in advance for fixing the conductive particles 12a onto the baseplate. If an anchor layer is provided on the substrate 11 in advance, then the conductive particles 12a can be fixed onto the baseplate securely, and moreover the placing of the conductive particles 12a on the baseplate can be carried out easily. A polyurethane or the like can be suitably used as the anchor layer.

Moreover, to fix the conductive particles 12a onto the baseplate, the conductive particles 12a may be compressed toward the glass baseplate so as to form a compressed layer. This is useful since in this case the conductive particles 12a can be adhered to the glass baseplate without forming an anchor layer. The compression can be carried out using a sheet press, a roll press, or the like. Note that even in this case, it is preferable to provide an anchor layer on the baseplate in advance. In this case, the conductive particles 12a can be fixed onto the baseplate more securely.

As the baseplate, for example, other than glass, a film of a polyester, polyethylene, polypropylene or the like, or any of various plastic baseplates can be used.

Next, the binder is applied onto the surface of the compressed layer. As a result, some of the binder penetrates into the compressed layer.

The substrate 11 is then laid onto the binder, and curing is carried out by irradiating with high energy radiation from the substrate 11 side, whereby a structure comprising the conductive layer 12, the cured material layer 15, and the substrate 11 is formed. As a result of the above, the binder that has penetrated in between the conductive particles 12a and then been cured fixes the conductive particles 12a in place so as to form the conductive layer 12. Moreover, the binder that has not penetrated in between the conductive particles 12a is cured as is to form the cured material layer 15. At this time, the substrate 11 and the cured material layer 15 are also adhered together. The high energy radiation may be, for example, light such as UV radiation, or else an electron beam, γ-rays, X-rays or the like.

By irradiating with high energy radiation from the substrate 11 side in this way, the binder is cured so that the respective layers are formed. After that, the baseplate is peeled away from the laminate obtained, whereby the transparent conductor 20 shown in FIG. 3 is obtained The content of the conductive particles 12a in he material constituting the conductive layer 12 in the present embodiment is preferably in a range of 10 vol % to 70 vol %. If this content is less than 10 vol %, then compared with the case that this content is in the above range, the electrical resistance of the transparent conductor 20 will tend to increase, whereas if this content exceeds 70 vol %, then compared with the case that this content is in the above range, the mechanical strength of the conductive layer 12 will tend to drop.

Preferred embodiments of the present invention have been described above, but the present invention is not limited to the above embodiments.

For example, in the description of the method of manufacturing each of the transparent conductors 2a and 20, for the resin or the cured material 15a, a material that can be cured by high energy radiation is used, but instead of this, a material that can be cured by heat may be used.

Moreover, the transparent conductor 2a or 20 can be used in a panel switch other than a touch panel such as a light-transmitting switch, and furthermore instead of a panel switch, can also be suitably used in a noise-counteracting component, a heating element, an EL electrode, a backlight electrode, an LCD, a PDP, or the like.

EXAMPLES

Following is a more detailed description of the present invention through examples. However, the present invention is not limited to these examples.

[Manufacture of conductive particles] An aqueous solution of 19.9 g of indium chloride tetrahydrate (made by Kanto Chemical Co, Inc.) and 2.6 g of stannic chloride (made by Kanto Chemical Co, Inc.) in 980 g of water, and ammonia water (made by Kanto Chemical Co, Inc) that had been diluted with water by a factor of 10 were mixed together, thus producing a white precipitate (coprecipitate).

The liquid containing the produced precipitate was subjected to solid-liquid separation using a centrifugal separator so as to obtain the solid matter. This solid matter was further put into 1000 g of water, dispersion was carried out using a homogenizer, and solid-liquid separation was again carried out using a centrifugal separator. The dispersion and solid-liquid separation were repeated 5 times, and then the solid matter was dried, and then heated for 1 hour at 600° C. in a nitrogen atmosphere, thus obtaining an ITO powder (conductive particles).

Example 1

One end of a 10 cm×30 cm polyethylene terephthalate (PET) film (substrate, made by Teijin, thickness 100 μm) was stuck onto a glass baseplate using double sided adhesive tape, thus fixing the substrate onto the glass baseplate.

Next, 150 parts by mass of the ITO powder (mean particle diameter 30 nm), 50 parts by mass of 2-(perfluorooctyl)ethyl acrylate (monomer, made by Daikin Fine Chemical Laboratory, trade name: R-1820), 20 parts by mass of polyethylene glycol diacrylate (made by Shin-Nakamura Chemical Corporation, trade name: A-400), 5 parts by mass of dipentaerythritol hexaacrylate (other monomer, made by Shin-Nakamura Chemical Corporation, trade name: A-DPH), 25 parts by mass of an acrylic polymer (average molecular weight approximately 100,000 average of 50 acryloyl groups and average of 25 triethoxysilane groups per molecule), and 1 part by mass of a UV polymerization initiator (made by Ciba Specialty Chemicals, trade name: IRGACURE 907) were dispersed in 30 parts by mass of acetone to obtain a dispersion. The dispersion was then applied onto the substrate using a bar coating method to form a film such that the thickness after curing would be 10 μm. The film was then irradiated with UV using a high-pressure mercury lamp as a light source with a cumulative dose of 3000 mJ/cm$^2$, thus forming a conductive layer.

The glass baseplate was then separated away from the substrate, whereby a transparent conductor A having the conductive layer laminated thereon was obtained.

Example 2

A transparent conductor B was obtained through the same procedure as in Example 1, except that the 2-(perfluorooctyl) ethyl acrylate used in Example 1 was changed to perfluoro (3,6,9,12-tetraoxatetradecanoyl) acrylate (monomer).

Example 3

A transparent conductor C was obtained through the same procedure as in Example 1, except that the 2-(perfluorooctyl) ethyl acrylate used in Example 1 was changed to perfluoro (3,7,11-trioxapentadecanoyl) acrylate (monomer).

Example 4

A transparent conductor D was obtained through the same procedure as in Example 1, except that the 2-(perfluorooctyl) ethyl acrylate used in Example 1 was changed to 2-(perfluorobutyl)ethyl acrylate (monomer, made by Daikin Fine Chemical Laboratory, trade name: R-1420).

Example 5

A transparent conductor E was obtained through the same procedure as in Example 1, except that the amount of the 2-(perfluorooctyl)ethyl acrylate used in Example 1 was changed to 10 parts by mass, and 40 parts by mass of 2-hydroxy-3-phenoxypropyl acrylate (made by Shin-Nakamura Chemical Corporation, trade name: 702A) was further added to the dispersion.

Comparative Example 1

One end of a 10 cm×30 cm polyethylene terephthalate (PET) film (substrate, made by Teijin, thickness 100 μm) was stuck onto a glass baseplate using double sided adhesive tape, thus fixing the substrate onto the glass baseplate. Next, 60 parts by mass of the ITO powder (mean particle diameter 30 μm) was dispersed in 200 parts by mass of a 20 mass % THV 200A (made by DAIONIN) MEK solution to obtain a dispersion. The dispersion was then applied onto the substrate using a bar coating method to form a film such that the thickness after curing would be 10 μm. The curing method used was to leave for 1 hour in a hot air drying oven at 100° C. Through this method, a transparent conductor F was obtained.

Comparative Example 2

A transparent conductor G was obtained through the same procedure as in Example 1, except that the 2-(perfluorooctyl) ethyl acrylate used in Example 1 was changed to 2-hydroxy-3-phenoxypropyl acrylate (made by Shin-Nakamura Chemical Corporation, trade name: 702A).

[Evaluation Method]

(Evaluation of resistance of transparent conductors) Each of the conductors A to G obtained in Examples 1 to 5 and Comparative Examples 1 and 2 above was cut into a 50 mm square, the electrical resistance value was measured using a 4-terminal 4-probe surface resistance measuring apparatus (MCP-T600 made by Mitsubishi Chemical Corporation) for a preset measurement point on the ITO surface, and the measured value was taken as the initial surface resistance value. Next, the conductor was left for 1000 hours under a 60° C. 95% RH environment and then the surface resistance value was measured again using the above method, the measured value being taken as the post-loading surface resistance value. The change factor was then calculated based on the following formula.

Change factor=post-loading surface resistance value/initial surface resistance value.

The results obtained are shown in Table 1.

TABLE 1

|  | Initial surface resistance value kΩ/□ | Post-loading surface resistance value kΩ/□ | Change factor |
|---|---|---|---|
| Example 1 | 5.71 | 4.53 | 0.79 |
| Example 2 | 6.11 | 4.69 | 0.77 |
| Example 3 | 5.68 | 4.61 | 0.81 |
| Example 4 | 6.03 | 4.68 | 0.78 |
| Example 5 | 6.23 | 6.79 | 1.09 |
| Comparative | 4.46 | 6.29 | 1.41 |

TABLE 1-continued

|  | Initial surface resistance value kΩ/□ | Post-loading surface resistance value kΩ/□ | Change factor |
|---|---|---|---|
| Example 1 Comparative Example 2 | 5.88 | 9.00 | 1.53 |

It can be seen from Table 1 that the electrical resistance change factor is lower for Examples 1 to 5 in which there is one of the substituents represented by general formula (1) to (4) in the side chains than for Comparative Examples 1 and 2 in which there is no substituent represented by any of general formula (1) to (4), i.e. increase in the electrical resistance can be adequately suppressed. From the above results, it can be seen that according to the transparent conductor of the present invention, increase in or change over time in the electrical resistance thereof can be adequately suppressed even under a high-humidity environment, and moreover even if friction arises between such transparent conductors in a touch panel or the like, the surface of each transparent conductor can be prevented from being worn away, and hence local increase in the electrical resistance can be adequately suppressed.

What is claimed is:

1. A transparent conductor, comprising:
   a substrate; and
   a conductive layer containing conductive particles and a cured material of a binder;
   wherein said binder has at least one substituent selected from the group comprising substituents represented by undermentioned general formula (1) to (4) on side chains thereof wherein n, m and p in formula (1) to (3) each represents a positive integer;
wherein said binder has a fluorine content of 1.85 to 68.3 mass %.

2. The transparent conductor according to claim 1, wherein said binder is one polymerized from at least one monomer, said monomer having therein a substituent represented by one of undermentioned general formula (1) to (4)

-continued (4)

wherein n, m and p in formula (1) to (3) each represents a positive integer.

3. The transparent conductor according to claim 2, wherein said monomer has therein a polymerizable functional group represented by one of undermentioned general formula (5) to (8)

wherein $R^1$ in formula (5) represents a bivalent hydrocarbon group, and $R^2$ represents a hydrogen atom or a methyl group; and $R^3$ in formula (7) represents a hydrogen atom, a methyl group, an ethyl group, or a propyl group.

4. The transparent conductor according to claim 3, wherein said polymerizable functional group is a polymerizable functional group represented by the general formula (5).

5. The transparent conductor according to claim 2, wherein said binder contains a copolymer of said monomer, and one other monomer having a vinyl group therein.

6. The transparent conductor according to claim 3, wherein said binder contains a copolymer of said monomer, and one other monomer having a vinyl group therein.

7. The transparent conductor according to claim 4, wherein said binder contains a copolymer of said monomer, and one other monomer having a vinyl group therein.

8. The transparent conductor according to claim 1, wherein said binder has a glass transition point of not more than 50° C.

9. The transparent conductor according to claim 1, wherein said conductive particles have a mean particle diameter between 10 to 80 nm.

10. The transparent conductor according to claim 1, wherein said conductive particles have a specific surface area between 10 to 50 $m^2/g$.

11. The transparent conductor according to claim 1, wherein said conductive layer has a thickness between 50 nm to 5 μm.

12. The transparent conductor according to claim 1, wherein said conductive particles have a content of 10 to 70 vol %.

13. The transparent conductor according to claim 1, wherein said binder has a fluorine content of 1.85 to 68.3 mass %, said binder has a glass transition point of not more than 50° C., said conductive particles have a mean particle diameter between 10 to 80 nm, said conductive particles have a specific surface area between 10 to 50 $m^2/g$, said conductive layer has a thickness between 50 nm to 5 μm, and said conductive particles have a content of 10 to 70 vol%.

* * * * *